(12) United States Patent
Speyer et al.

(10) Patent No.: US 6,580,389 B2
(45) Date of Patent: Jun. 17, 2003

(54) ATTITUDE DETERMINATION USING A GLOBAL POSITIONING SYSTEM

(75) Inventors: Jason L. Speyer, Los Angeles, CA (US); Laurence H. Mutuel, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/928,099

(22) Filed: Aug. 10, 2001

(65) Prior Publication Data

US 2002/0021243 A1 Feb. 21, 2002

Related U.S. Application Data

(60) Provisional application No. 60/224,916, filed on Aug. 10, 2000.

(51) Int. Cl.$^7$ ................................................ G01S 5/14
(52) U.S. Cl. .................................................. 342/357.11
(58) Field of Search ...................... 342/357.11, 357.14; 701/216

(56) References Cited

U.S. PATENT DOCUMENTS

4,754,280 A * 6/1988 Brown et al. .......... 342/357.11
6,089,507 A    7/2000 Parvez et al.

OTHER PUBLICATIONS

Estimation Based Navigation, http://www.nd.edu/NDInfo/Research/sskaar/KalmanFilter.html, Jan. 20, 1995.*
M.G. Sadaka, Tightly Coupled Relative Differential GPS, INS and Airdata Fusion Filter Applied to Formation–Flight, M.S. Thes UCLA, p. i–41, 87–92, Mar. 26, 1999.*
P.S. Maybeck, Schochastic models, estimation, and control, vol. 1, p. 289–306, 342–362, 1979.*
Military Specification, U.S. Department of Defense, "Flying Qualities of Piloted Airplanes," MIL–F–8785C, 1980, 93 pp.
C. Cohen, Attitude Determination, Ch. 19, 1995, p. 519–538.
B. Parkinson et al., Aircraft Automatic Approach and Landing Using GPS, Ch. 14, 1995, 397–425.
T. Talay, "Introduction to the Aerodynamics of Flight," http://history.nasa.gov/SP–367/, 1975, 7pp.
W. Williamson et al., "A Comparison of State Space, Range Space, and Carrier Phase Differential GPS/INS Relative Navigation," Proceedings of the American Control Conf., Chicago, IL, Jun. 2000, 2932–2938.
B.W. Parkinson et al., "Global Positioning System: Theory and Applications," Progress in Astronautics and Aeronautics, Washington DC, vol. 163, 9pp.
L.H. Mutuel et al., "A Discrete–Time Game–Theoretic Fault Detection Filter,"Proceedings of the American Control Conf., Chicago, IL, Jun. 2000, 3388–3392.
A.J. Connolly et al., "The Design of LQG & Hx Controllers for Use in Active Vibration Control & Narrow Band Disturbance Rejection," Proceedings of the 34$^{th}$ Conf. On Decision & Control, New Orleans, LA, Dec. 1995, 2982–2987.
S.P. Pullen et al., "Control System Optimization with Unbounded Uncertainty: Application to Aircraft Precision Approach Using GPS," Proceedings of the 35$^{th}$ Conf. On Decision & Control, Kobe, Japan, Dec. 1996, 1339–1340.

* cited by examiner

Primary Examiner—Thomas H. Tarcza
Assistant Examiner—Fred H Mull
(74) Attorney, Agent, or Firm—Gates & Cooper

(57) ABSTRACT

An apparatus and method for vehicle orientation determination is disclosed. A typical method comprises the steps of receiving position and velocity information data from a global positioning system receiver unit, receiving vehicle dynamics information data from one or more vehicle dynamics sensors and determining a vehicle attitude from the position and velocity information and the vehicle dynamics information data using a Kalman filter.

36 Claims, 27 Drawing Sheets

$$\Phi = \begin{bmatrix}
X_x & 0 & 0 & 0 & 0 & 0 & 0 & 0 & 0 & 0 & 0 & 0 \\
0 & Y_y & 0 & 0 & 0 & 0 & 0 & 0 & 0 & 0 & 0 & 0 \\
0 & 0 & Z_z & 0 & 0 & 0 & 0 & 0 & W_z & 0 & 0 & 0 \\
0 & Y_\phi & 0 & \Phi_\phi & 0 & \Psi_\phi & 0 & V_\phi & 0 & P_\phi & 0 & R_\phi \\
X_\theta & 0 & Z_\theta & 0 & \theta_\theta & 0 & U_\theta & 0 & W_\theta & 0 & 0 & 0 \\
0 & Y_\psi & 0 & 0 & 0 & \Psi_\psi & 0 & 0 & 0 & 0 & 0 & 0 \\
X_u & 0 & Z_u & 0 & \theta_u & 0 & U_u & 0 & W_u & 0 & Q_u & 0 \\
0 & Y_v & 0 & \Phi_v & 0 & \Psi_v & 0 & V_v & 0 & P_v & 0 & R_v \\
X_w & 0 & Z_w & 0 & \theta_w & 0 & U_w & 0 & W_w & 0 & Q_w & 0 \\
0 & Y_p & 0 & \Phi_p & 0 & \Psi_p & 0 & V_p & 0 & P_p & 0 & R_p \\
X_q & 0 & Z_q & 0 & \theta_q & 0 & U_q & 0 & W_q & 0 & Q_q & 0 \\
0 & Y_r & 0 & \Phi_r & 0 & \Psi_r & 0 & V_r & 0 & P_r & 0 & R_r
\end{bmatrix}$$

FIG. 3

| $X_x = 1$ | $Y_y = 1$ | $Z_z = 1$ |
|---|---|---|
| $X_\theta = -0.0028$ | $Y_\phi = -0.0017$ | $Z_\theta = -0.1221$ |
| $X_u = 0.0993$ | $Y_\psi = 0.1222$ | $Z_u = -0.0072$ |
| $X_w = 0.0049$ | $Y_v = 0.0984$ | $Z_w = 0.0855$ |
| $X_q = -0.0034$ | $Y_p = -0.0003$ | $Z_q = -0.0476$ |
|  | $Y_r = 0.0093$ |  |
| $\Phi_\phi = 0.9984$ | $\theta_\theta = 1$ | $\Psi_\phi = 0.0011$ |
| $\Phi_v = -0.0612$ | $\theta_u = 0.0040$ | $\Psi_\psi = 1$ |
| $\Phi_p = 0.9759$ | $\theta_w = -0.0591$ | $\Psi_v = 0.0627$ |
| $\Phi_r = 2.0111$ | $\theta_q = 4.3974$ | $\Psi_p = -0.7375$ |
|  |  | $\Psi_r = 5.1225$ |
| $U_\theta = -0.0559$ | $V_\phi = 0.0538$ | $W_z = 0.0001$ |
| $U_u = 0.9899$ | $V_v = 0.8896$ | $W_\theta = 0.0002$ |
| $U_w = 0.0360$ | $V_p = 0.9496$ | $W_u = -0.0638$ |
| $U_q = -0.2423$ | $V_r = -5.9403$ | $W_w = 0.6603$ |
|  |  | $W_q = 4.2234$ |
| $P_\phi = -0.0006$ | $Q_u = 0.0016$ | $R_\phi = 0.0006$ |
| $P_v = -0.0098$ | $Q_w = -0.0176$ | $R_v = 0.0225$ |
| $P_p = -0.0591$ | $Q_q = 0.5528$ | $R_p = -0.1417$ |
| $P_r = 0.3974$ |  | $R_r = 0.7291$ |

*FIG. 4*

$$[B_{\delta_{tr}} \quad B_{\delta_{ll}} \quad B_{\delta_{ar}} \quad B_{\delta_{al}} \quad B_{ps}] = \begin{bmatrix} -0.0000 & -0.0000 & -0.0001 & -0.0001 & 0.0632 \\ 0.0004 & -0.0004 & -0.0000 & 0.0000 & 0.0000 \\ -0.0003 & -0.0003 & -0.0014 & -0.0014 & -0.0036 \\ -0.0240 & 0.0240 & -0.1252 & 0.1252 & -0.0000 \\ -0.0912 & -0.0912 & -0.0166 & -0.0166 & 0.0148 \\ -0.0390 & 0.0390 & -0.0033 & 0.0033 & -0.0000 \\ 0.0040 & 0.0040 & -0.0004 & -0.0004 & 1.2640 \\ 0.0531 & -0.0531 & -0.0033 & 0.0033 & 0.0000 \\ -0.1094 & -0.1094 & -0.0453 & -0.0453 & -0.0241 \\ -0.0071 & 0.0071 & -0.0270 & 0.0270 & -0.0000 \\ -0.0289 & -0.0289 & -0.0051 & -0.0051 & 0.0051 \\ -0.0126 & 0.0126 & 0.0017 & -0.0017 & -0.0000 \end{bmatrix}$$

FIG. 5

$$C = \begin{bmatrix} C_{xx} & C_{yx} & C_{zx} & C_{ux} & C_{vx} & C_{wx} \\ C_{xy} & C_{yy} & 0 & C_{uy} & C_{vy} & 0 \\ 0 & C_{yz} & C_{zz} & 0 & 0 & 0 \\ C_{x\phi} & C_{y\phi} & C_{z\phi} & 0 & 0 & 0 \\ C_{x\theta} & C_{y\theta} & C_{z\theta} & 0 & 0 & 0 \\ C_{x\psi} & C_{y\psi} & C_{z\psi} & 0 & 0 & 0 \\ 0 & 0 & 0 & C_{uu} & C_{vu} & C_{wu} \\ 0 & 0 & 0 & C_{uv} & C_{vv} & 0 \\ 0 & 0 & 0 & C_{uw} & C_{vw} & C_{ww} \\ 0 & 0 & 0 & C_{up} & C_{vp} & C_{wp} \\ 0 & 0 & 0 & C_{uq} & C_{vq} & C_{wq} \\ 0 & 0 & 0 & C_{ur} & C_{vr} & C_{wr} \end{bmatrix}$$

FIG. 6

| | | |
|---|---|---|
| $C_{x_x} = -0.2625$<br>$C_{x_y} = 0.8829$<br>$C_{x_z} = 0.4415$<br>$C_{x_\theta} = -0.2544$<br>$C_{x_\psi} = 0.8606$ | $C_{y_x} = 0.4897$<br>$C_{y_y} = 0.4727$<br>$C_{y_z} = -0.7320$<br>$C_{y_\phi} = 0.2347$<br>$C_{y_\theta} = 0.4784$<br>$C_{y_\psi} = 0.4576$ | $C_{z_x} = -0.8222$<br>$C_{z_z} = -0.5592$<br>$C_{z_\phi} = 0$<br>$C_{z_\theta} = 1.0262$<br>$C_{z_\psi} = 0$ |
| $C_{u_x} = -0.0001$<br>$C_{u_y} = 0$<br>$C_{u_u} = -0.2625$<br>$C_{u_v} = 0.8829$<br>$C_{u_w} = 0.3892$<br>$C_{u_p} = 0.4415$<br>$C_{u_q} = -0.2579$<br>$C_{u_r} = 0.8829$ | $C_{v_x} = 0.0001$<br>$C_{v_y} = 0$<br>$C_{v_u} = 0.4937$<br>$C_{v_v} = 0.4695$<br>$C_{v_w} = -0.7320$<br>$C_{v_p} = 0.2347$<br>$C_{v_q} = 0.4851$<br>$C_{v_r} = 0.4695$ | $C_{w_x} = 0.0001$<br>$C_{w_u} = -0.8290$<br>$C_{w_w} = -0.5592$<br>$C_{w_p} = 0$<br>$C_{w_q} = 0.9737$<br>$C_{w_r} = 0$ |

FIG. 7

$$L_k = P_{ss}C^TV^{-1} = \begin{bmatrix} -0.0018 & 0.0036 & -0.0119 & -0.0151 & 0.0287 & -0.0459 \\ 0.0165 & 0.0094 & -0.0015 & -0.0009 & 0.0052 & -0.0069 \\ 0.0018 & -0.0111 & -0.0198 & -0.0581 & 0.1094 & -0.2669 \\ 0.0003 & 0.0002 & -0.0000 & -0.0000 & 0.0001 & -0.0001 \\ -0.0031 & 0.0125 & 0.0171 & 0.0459 & -0.0864 & 0.2114 \\ 0.0014 & 0.0008 & -0.0001 & -0.0001 & 0.0004 & -0.0006 \\ 0.0010 & -0.0056 & -0.0086 & -0.0280 & 0.0527 & -0.1221 \\ 0.0000 & 0.0000 & -0.0000 & -0.0000 & 0.0000 & -0.0000 \\ 0.0001 & -0.0009 & -0.0010 & 0.1755 & -0.3301 & -0.2808 \\ 0.0000 & 0.0000 & -0.0000 & -0.0000 & 0.0000 & -0.0000 \\ 0.0000 & 0.0001 & 0.0002 & -0.0051 & 0.0096 & 0.0102 \\ -0.0000 & 0.0000 & -0.0000 & -0.0000 & 0.0000 & -0.0000 \end{bmatrix}$$

*FIG. 8*

| State | Mean error | One sigma error |
|---|---|---|
| position x<br>position y<br>altitude | 0.02 ft<br>0.12 ft<br>0.07 ft | 2.14 ft<br>2.1 ft<br>1.8 ft |
| roll angle<br>pitch angle<br>yaw angle | 0.0022 deg<br>0.015 deg<br>0.009 deg | 0.04 deg<br>1.6 deg<br>0.18 deg |
| long. speed<br>lat. speed<br>vert. speed | 0.032 ft/s<br>0.00017 ft/s<br>0.0045 ft/s | 0.82 ft/s<br>0.0034 ft/s<br>1.1 ft/s |
| roll rate<br>pitch rate<br>yaw rate | 0.2 mdeg/s<br>16 mdeg/s<br>1 mdeg/s | 3.8 mdeg/s<br>2.8 mdeg/s<br>18 mdeg/s |

*FIG. 11*

| State | Mean error | One sigma error |
|---|---|---|
| position x | 0.2 ft | 1.75 ft |
| position y | 0.25 ft | 2.6 ft |
| altitude | 0.1 ft | 1.6 ft |
| roll angle | 0.005 deg | 0.05 deg |
| pitch angle | 0.12 deg | 1.5 deg |
| yaw angle | 0.009 deg | 0.22 deg |
| long. speed | 0.03 ft/s | 0.74 ft/s |
| lat. speed | 0.0004 ft/s | 0.004 ft/s |
| vert. speed | 0.043 ft/s | 1.12 ft/s |
| roll rate | 0.4 mdeg/s | 4 mdeg/s |
| pitch rate | 0.19 deg/s | 2.8 deg/s |
| yaw rate | 2 mdeg/s | 23 mdeg/s |

*FIG. 14*

| State | Mean error | One sigma error |
|---|---|---|
| position x | 0.01 ft | 1.38 ft |
| position y | 0.37 ft | 1.86 ft |
| altitude | 0.19 ft | 1.8 ft |
| roll angle | 0.007 deg | 0.038 deg |
| pitch angle | 0.098 deg | 1.6 deg |
| yaw angle | 0.03 deg | 0.15 deg |
| long. speed | 0.1 ft/s | 0.82 ft/s |
| lat. speed | 0.0005 ft/s | 0.002 ft/s |
| vert. speed | 0.03 ft/s | 1.12 ft/s |
| roll rate | 0.5 mdeg/s | 3 mdeg/s |
| pitch rate | 0.14 deg/s | 2.8 deg/s |
| yaw rate | 3 mdeg/s | 16 mdeg/s |

*FIG. 17*

| State | Mean error | One sigma error |
|---|---|---|
| position x<br>position y<br>altitude | 1.6 ft<br>2.78 ft<br>3.82 ft | 1.8 ft<br>2 ft<br>1.92 ft |
| roll angle<br>pitch angle<br>yaw angle | 0.05 deg<br>0.5 deg<br>0.23 deg | 0.04 deg<br>2.4 deg<br>0.17 deg |
| long. speed<br>lat. speed<br>vert. speed | 0.3 ft/s<br>0.0044 ft/s<br>0.092 ft/s | 0.85 ft/s<br>0.0032 ft/s<br>1.14 ft/s |
| roll rate<br>pitch rate<br>yaw rate | 4 mdeg/s<br>0.33 deg/s<br>25 mdeg/s | 3.44 mdeg/s<br>3.57 deg/s<br>17 mdeg/s |

*FIG. 20*

| State | Mean error | One sigma error |
|---|---|---|
| position x | 0.06 ft | 1.3 ft |
| position y | 0.65 ft | 2.13 ft |
| altitude | 0.23 ft | 1.85 ft |
| roll angle | 0.013 deg | 0.043 deg |
| pitch angle | 0.16 deg | 1.75 deg |
| yaw angle | 0.055 deg | 0.18 deg |
| long. speed | 0.1 ft/s | 0.85 ft/s |
| lat. speed | 0.001 ft/s | 0.0034 ft/s |
| vert. speed | 0.039 ft/s | 1.12 ft/s |
| roll rate | 1 mdeg/s | 3.44 mdeg/s |
| pitch rate | 0.18 deg/s | 3 deg/s |
| yaw rate | 5 mdeg/s | 19 mdeg/s |

*FIG. 23*

| State | Mean error | One sigma error |
|---|---|---|
| position x<br>position y<br>altitude | 8.65 ft<br>12.15 ft<br>19.25 ft | 3.64 ft<br>4 ft<br>4.6 ft |
| roll angle<br>pitch angle<br>yaw angle | 0.24 deg<br>1.48 deg<br>1.03 deg | 0.082 deg<br>3.86 deg<br>0.34 deg |
| long. speed<br>lat. speed<br>vert. speed | 1.2 ft/s<br>0.019 ft/s<br>0.2 ft/s | 1.17 ft/s<br>0.0065 ft/s<br>1.22 ft/s |
| roll rate<br>pitch rate<br>yaw rate | 21 mdeg/s<br>0.67 deg/s<br>0.11 deg/s | 7 mdeg/s<br>4.7 deg/s<br>36 mdeg/s |

*FIG. 26*

| State | Generic | ADU2™ | TANS Vector™ | C-MIGITS II™ | GPS/AC |
|---|---|---|---|---|---|
| altitude | 2m | 3m | 5-8m | 4.5m | 0.5m |
| roll angle | 30 deg | 0.8 deg² | 0.3 deg | 0.11 deg | 0.1 deg |
| pitch angle | 30 deg | 0.8 deg² | 0.3 deg | 0.11 deg | 1.6 deg |
| yaw angle | 30 deg | 0.4 deg² | 0.3 deg | 0.2 deg | 0.2 deg |
| forward speed | 0.2 m/s¹ | 0.5 m/s | 0.2 m/s¹ | 0.6 m/s | 0.24 m/s |
| vertical speed | 0.2 m/s¹ | 0.5 m/s | 0.2 m/s¹ | 1.2 m/s | 0.33 m/s |
| lateral speed | 0.2 m/s¹ | 0.5 m/s | 0.2 m/s¹ | 0.6 m/s | 0.001 m/s |
| pitch rate | 300 deg/s | 1.6 deg/s | 3 deg/s | 1.1 deg/s | 2.8 deg/s |
| roll rate | 300 deg/s | 1.6 deg/s | 3 deg/s | 1.1 deg/s | 0.004 deg/s |
| yaw rate | 300 deg/s | 1.6 deg/s | 3 deg/s | 1.1 deg/s | 0.02 deg/s |

[1] Accuracy stated by the US Department of Defense.
[2] Accuracy increases with antenna separation - nominally 1m.

FIG. 27

ATTITUDE DETERMINATION USING A GLOBAL POSITIONING SYSTEM

CROSS-REFERENCE TO RELATED APPLICATIONS

This application claims the benefit under 35 U.S.C. §119 (e) of co-pending and commonly assigned U.S. Provisional Patent Application Serial No. 60/224,916, filed on Aug. 10, 2000, by Jason L. Speyer and Laurence H. Mutuel, entitled "AIRCRAFT ATTITUDE DETERMINATION USING GPS," and attorney's docket number 30435.100USP1, which application is incorporated by reference herein.

STATEMENT REGARDING FEDERALLY SPONSORED RESEARCH OR DEVELOPMENT

This invention was made with Government support under Grant No. 4-442568-23265, awarded by the National Aeronautics & Space Administration. The Government has certain rights in this invention.

BACKGROUND OF THE INVENTION

1. Field of the Invention

The present invention relates to methods and systems for determining vehicle attitude, and particularly for determining vehicle attitude using a global positioning system (GPS).

2. Description of the Related Art (Note: This application references a number of different publications as indicated throughout the specification by reference numbers enclosed in brackets, e.g., [x]. A list of these different publications ordered according to these reference numbers can be found below at the end of the Detailed Description of the Preferred Embodiment. Each of these publications is incorporated by reference herein.)

The use of the global positioning system (GPS) is now widespread and it seems to have become a preferred instrument for high accuracy position and velocity estimation in inertial space. However, a stand-alone GPS receiver is unable to estimate the attitude of an aircraft, information critical to the pilot in adverse weather or at night. To obtain attitude information, the GPS is often coupled with an inertial instrument or a beacon [1]. However, it is well known that this coupled system needs nonzero acceleration to keep the aircraft yaw estimate from wandering off.

The current global positioning system is composed of a constellation of satellites. A GPS receiver is composed of an antenna and a receiver unit. The antenna receives position and velocity information from all satellites within a predetermined cone. The information from each satellite is fused within the GPS receiver unit into a unique set of three positions and three velocities in the coordinate system called Earth-Centered-Earth-Fixed (ECEF). The information from the GPS has not been fused with the dynamics of the platform. In other words, the GPS information does not explicitly take into account whether the antenna is on a hand-held device, a parked car, a moving boat or a cruising aircraft; no additional information from the geometry or the dynamics of the platform is used.

To gain precision on the position and velocity information, multiple schemes have been developed in which the GPS sensor is aided by beacons or inertial systems like VOR, LORAN C or inertial measurement units (IMU). When the GPS is to be used as a stand-alone instrument for attitude determination, multiple antennas distributed over the platform are required. The main problem with using a single GPS antenna is the inability of the sensor to determine attitude.

To obtain attitude, the GPS has been previously coupled with an inertial instrument or has used multiple antennas. The result is an estimate of attitude at the cost of additional hardware and therefore weight and complexity in the navigation system. Moreover, the multiple antennas systems require the antennas be spaced about a meter apart. The cost of the alternative accurate GPS/inertial or multiple antennas navigation systems represents a considerable investment, say for general aviation aircraft and is mostly restricted to military use.

SUMMARY OF THE INVENTION

An apparatus and method for vehicle orientation determination is disclosed. A typical method comprises the steps of receiving position and velocity information data from a global positioning system receiver unit, receiving vehicle dynamics information data from one or more vehicle dynamics sensors and determining a vehicle attitude from the position and velocity information and the vehicle dynamics information data using a Kalman filter.

The present invention discloses a novel instrument capable of estimating accurately all aircraft states (position, attitude, velocity and angular rates) with only the input from a single low-grade inexpensive GPS receiver and the aid of the aircraft dynamics. This innovative navigation aid provides the aircraft attitude over the right envelope and in different exogenous weather conditions.

BRIEF DESCRIPTION OF THE DRAWINGS

Referring now to the drawings in which like reference numbers represent corresponding parts throughout:

FIG. 3 is a table that summarizes the values of the aircraft dynamics;

FIG. 4 is a table that represents stability derivatives for the aircraft model;

FIG. 5 is a control surface efficiency matrix;

FIG. 6 is a linearized GPS measurement matrix;

FIG. 7 is a table that summarizes the coefficients in the measurement equation;

FIG. 8 is a table that summarizes the constant gains for the Kalman filter;

FIG. 11 is a table which presents the statistics for the nominal estimation errors for the GPS/AC under nominal cruising;

FIG. 14 is a table which presents the statistics for the nominal estimation errors for the GPS/AC for 5 degrees doublet in the horizontal tail;

FIG. 17 is a table which summarizes the mean and standard deviation of the estimation error for the simulation of maneuvering in adverse weather;

FIG. 20 is a table which summarizes the mean and standard deviation of the estimation error for the simulation of mismatched control efficiency;

FIG. 23 is a table which summarizes the mean and standard deviation for the estimation error;

FIG. 26 is a table which summarizes the mean and standard deviation for the estimation error; and FIG. 27 is a table which compares the precision claimed by various alternatives and the present invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1.0 Overview

The present invention describes a navigation system for us in an aircraft or other vehicle platform, wherein the navigation system is comprised of a GPS receiver that is augmented by information concerning vehicle dynamics. Specifically, the navigation system uses Kalman-Filter-based, linearized measurements of vehicle dynamics, as well as linearized measurements from a GPS receiver. As the vehicle moves slowly on the Earth scale, a linear structure for the Kalman Filter is acceptable; for longer hauls, an extended structure for the Kalman Filter can be used.

1.1 Navigation System

Figure 1:
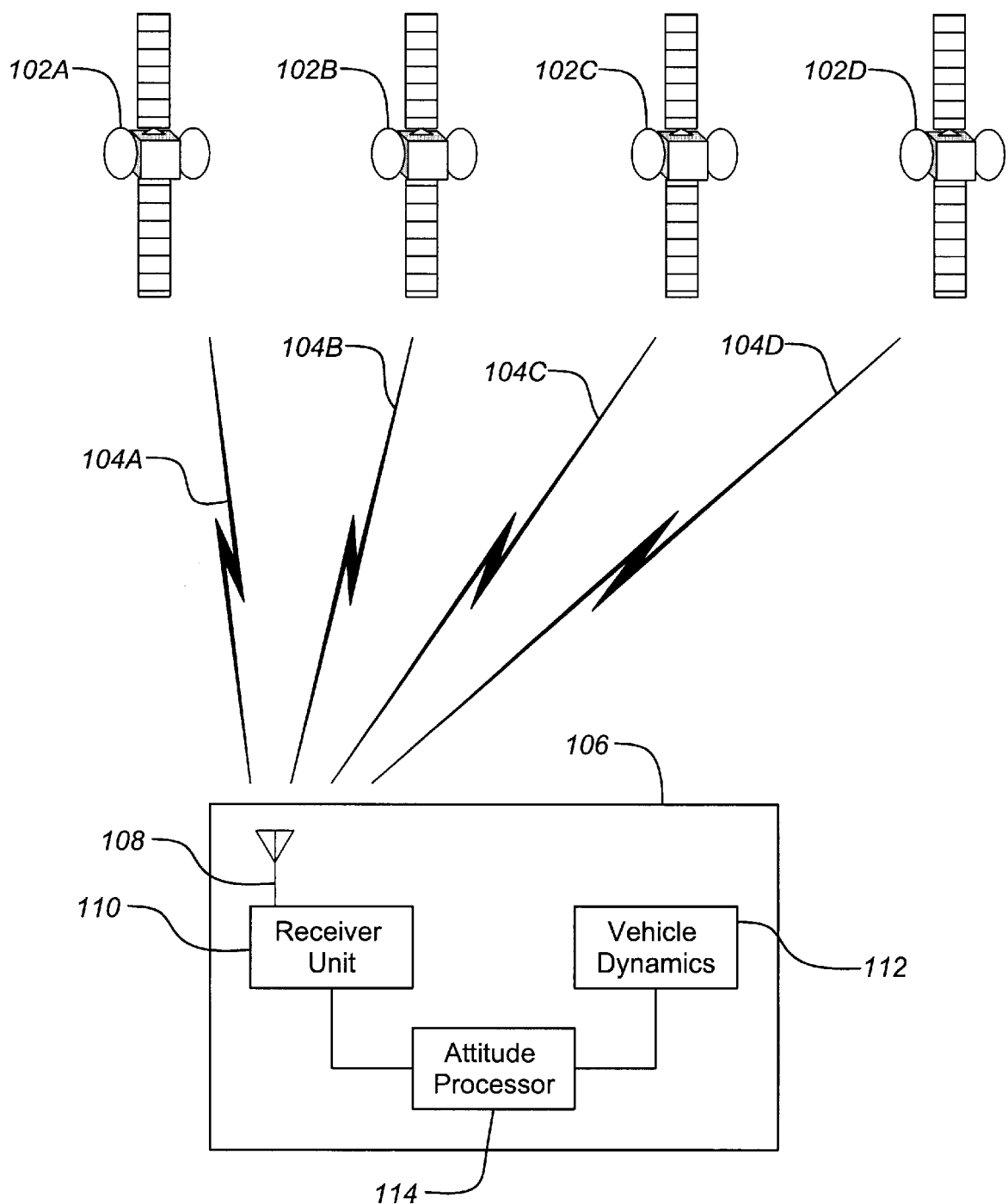
FIG. 1 is a schematic diagram of a typical system using an embodiment of the invention.

FIG. 1 is a schematic diagram of a navigation system according to an embodiment of the present invention. GPS satellites 102A–102D transmit codes 104A–104D, which are received at a vehicle platform 106 (e.g., an aircraft) by the GPS antenna 108. The antenna 108 is coupled to a GPS receiver unit 110, which processes the signals 104A–104D to generate position and velocity information for the vehicle platform 106. The vehicle platform 106 also includes vehicle dynamics sensors 112, which accumulate vehicle dynamics data, such as control surface positions. Both the receiver unit 110 and the sensors 112 are coupled to an attitude processor 114, which receives the position and velocity information data and the vehicle dynamics data, and then determines attitude information for the vehicle platform 106 from the position and velocity information data and the vehicle dynamics data. The attitude processor 114 may also obtain improved results by incorporating gain settings based upon other fixed external parameters, such as the weight of the vehicle platform 106.

Figure 2:
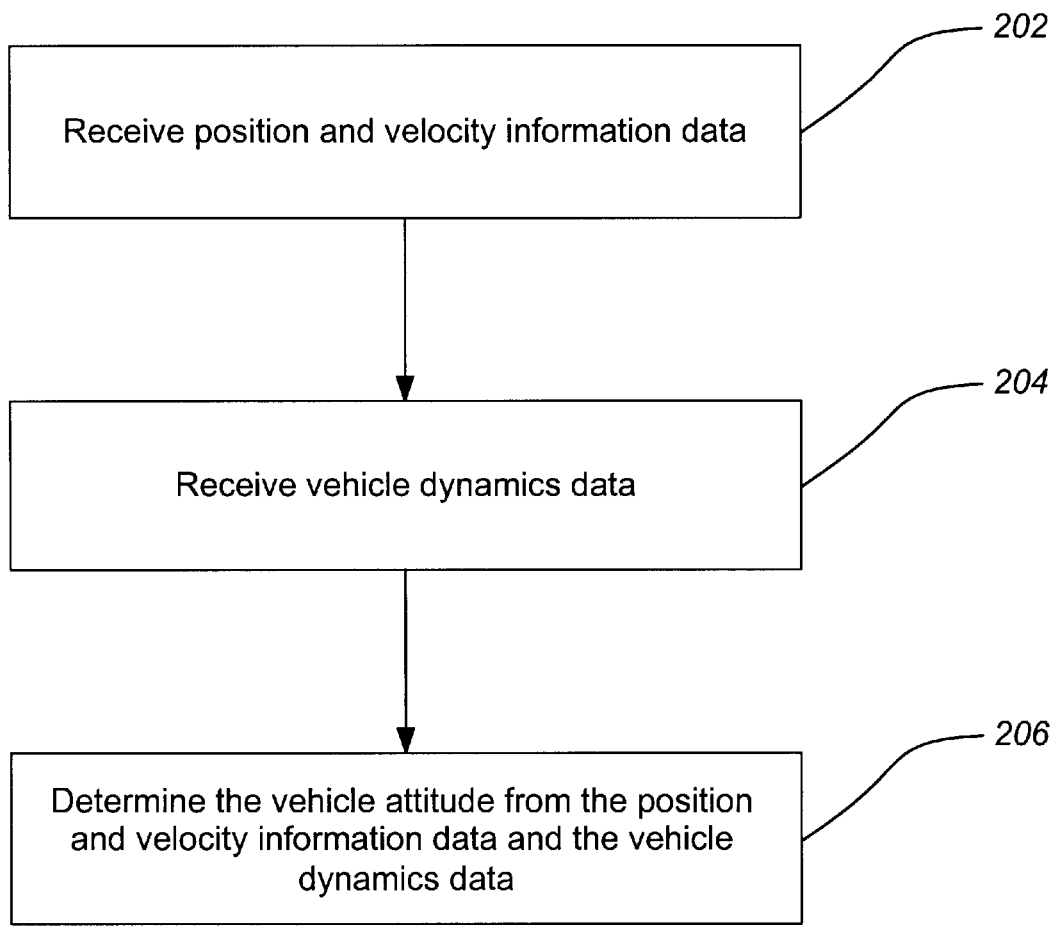
FIG. 2 is a flowchart that describes the steps performed by the attitude processor according to the preferred embodiment of the present invention.

FIG. 2 is a flowchart that generally describes the steps performed by the attitude processor 114 according to the preferred embodiment of the present invention. At block 200, position and velocity information data, typically derived from a GPS receiver unit 110, are received by the attitude processor 114. At block 202, vehicle dynamics data, such as control surface positions, is received by the attitude processor 114 from vehicle dynamics sensors 112. At block 204, the position and velocity information data and the vehicle dynamics data are used by the attitude processor 114 to determine the attitude of the vehicle platform 106. The attitude determination also requires certain parameters defined by the vehicle platform 106, as well as the GPS receiver unit 110 within the vehicle platform 106. Optionally, at block 204, gain settings may be based upon other fixed external parameters, such as the weight of the vehicle platform 106, may be applied to improve the attitude determination. More specific information on the operation of a hardware or software processing embodiment of the invention is provided in the following sections.

2.0 Simulation Results

Simulation results illustrate the performance of the invention for attitude determination using GPS. The simulation cases are chosen to illustrate the robustness of the invention to weather conditions, and uncertainties in the aircraft model. Tables are also provided which list price comparisons and performance with some current attitude determination techniques.

It should be noted from the outset that although the invention described herein is detailed with respect to the current GPS system, it will be apparent to those skilled in the art that the invention is equivalently applied to any GPS system which provides position and velocity information to the vehicle.

2.1 Example Aircraft and GPS Model

The aircraft model selected for these examples is a 137 lb unmanned aerial vehicle (UAV). The aircraft dynamics are obtained from linearizing the equations of motion about leveled flight at h=3,000 ft above sea level, a pitch angle of $\theta=2.7°$ and a ground speed of V=70 ft/s. The initial position is a longitude of 118° West and a latitude of 34° North, which is around Los Angeles. The aircraft state vector x includes the perturbed (away from initial) inertial positions (x; y; z), attitude angles ($\phi$, $\theta$, $\psi$), body axis speeds (u; v; w) and angular rates (p; q; r). The control vector u includes the perturbed deflections of the vehicle control surfaces, such as right and left tails, the right and left ailerons and throttle, based upon the vehicle dynamics information data. The system is preferably discretized at a minimum rate of 10 Hz.

$$x(k+1)=\Phi x(k)+Bu(k) \quad (1)$$

wherein FIG. 3 is a table that summarizes the values for $\Phi$ (the aircraft dynamics).

The position is such that x points North, y points East and z points up. The attitude angles are respectively the roll angle $\phi$, the pitch angle $\theta$ and the yaw angle $\psi$. The body axis speeds are respectively the forward speed u, the lateral speed v and the downward speed w. The angular rates are respectively the roll rate p, the pitch rate q and the yaw rate r.

FIG. 4 is a table that represents stability derivatives for the aircraft model. Note that the open loop aircraft is unstable in roll. Therefore, any asymmetric commands will result in an unstable spiraling down trajectory. Therefore, only commands that do not induce an unstable motion are used. The efficiency of each control surface is given by the control surface efficiency matrix shown in FIG. 5.

The measurement matrix is obtained after linearization of the GPS output equations for position and velocity in ECEF. The measurement vector z includes the ECEF position triplet $(P_{ex}, P_{ey}, P_{ez})$ and the ECEF velocity triplet $(V_{ex}, V_{ey}, V_{ez})$ based on the GPS position and velocity information data. The antenna is located 1 ft in front and 0.5 ft above the center of gravity on the aircraft centerline.

$$z(k)=Cx(k)+v(k) \qquad (2)$$

wherein FIG. 6 is a linearized GPS measurement matrix that summarizes the values for C. The determination of vehicle attitude may also be performed in a body axis or wind axis coordinate system.

FIG. 7 is a table that summarizes the coefficients in the measurement equation. The GPS information data is corrupted by noise in each channel, represented in the noise vector v. The noise is white with a standard deviation of 5 m for the position channels and 0.7 m/s for the velocity channels [1]. Now that the selective availability code has been removed, the uncertainty in position can be as low as 2 m in position. Therefore, the uncertainty models for the filter design are considered conservative. To test the scheme in adverse weather conditions, an exogenous disturbance, a moderate [2] vertical gust, is added.

The innovation is that the model defined by the aircraft dynamics ($\Phi$) and the linearized GPS measurement matrix C is completely observable, therefore all states can be estimated precisely within the measurement uncertainty.

The Kalman Filter can be designed with a gain matrix having constant gains $L_k$ as shown in FIG. 8, where $P_{ss}$ is the steady state solution to the Kalman Filter Riccati equation (vector equations (1) and (2)) and V is the measurement noise covariance matrix [3], however, the invention can be used with a general solution (not limited to a steady state condition) to the Ricatti matrix equation.

It should be noted here that the vehicle dynamics matrix and the vehicle control efficiency matrix are based upon vehicle parameters and the measurement coefficient matrix and noise vector are based upon global positioning receiver parameters. In addition, the model defined by the aircraft dynamics ($\Phi$) and the linearized GPS measurement matrix C, are applicable to a conventional aircraft configuration. However, applying the present invention those skilled in the art can readily devise other models applicable to other vehicles and aircraft configurations.

For comparison to present example, the noise from a good single antenna GPS instrument itself generates errors in position of 2 m rms or 6.6 ft rms, errors in speed of 0.7 m/s rms or 2.3 ft/s rms, errors in attitude angles of 30° rms and errors in angular rates of about 5 rd/s rms. The vertical gust is 3 ft/s rms which represents 4% of the ground velocity and at its maximum 13% of the ground velocity.

3.2 Nominal Performance of the GPS/AC Invention

The following simulations illustrate the performance of the GPS attitude control (GPS/AC) instrument in estimating the aircraft states. The "true" aircraft motion is given by the aircraft states. They are used to build the measurement vector which is then corrupted by noise in all channels and fed to the estimator. Longitudinal step response is studied. The estimation performance of the GPS/AC system is assessed by looking at the estimation error, i.e. the difference between the true aircraft state and the estimated state. This test is nominal in two ways: there is no adverse weather and there is no mismatch between the plant model used to design the estimator and the physical plant.

Figure 9:
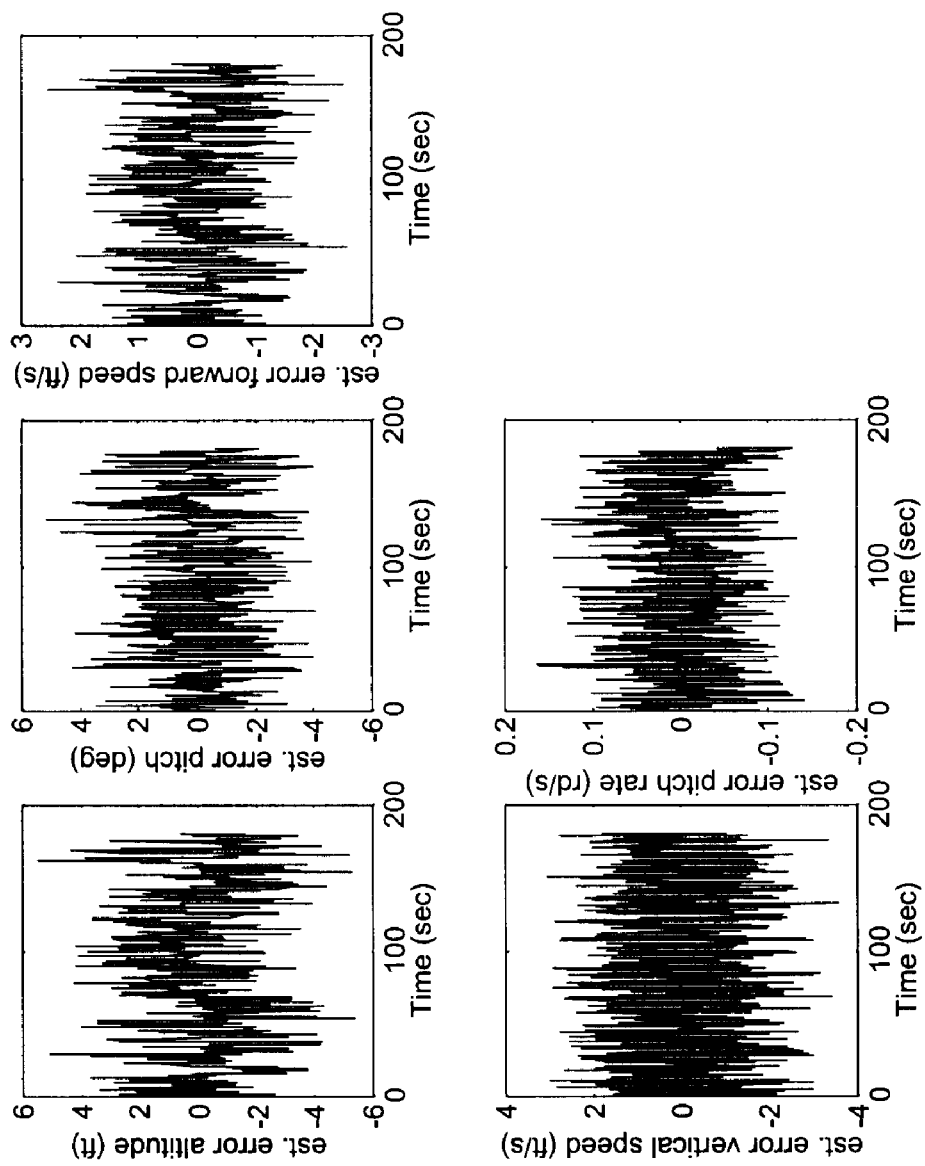
FIG. 9 depicts simulation plots of the estimation error for longitudinal states under nominal cruising.
Figure 10:
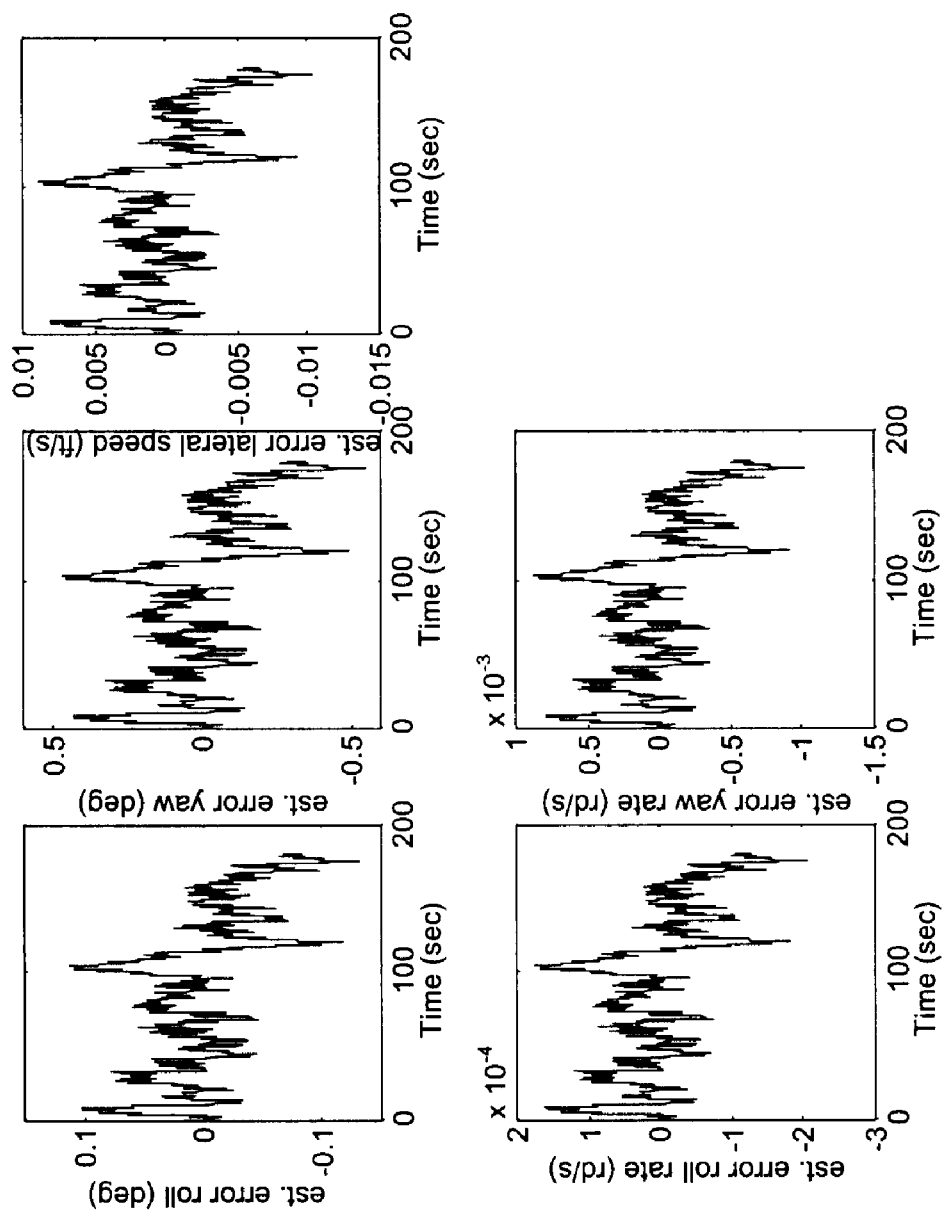
FIG. 10 depicts simulation plots of the estimation error for lateral states under nominal cruising.

FIGS. 9, 10 and 11 show the estimation errors for the example vehicle under nominal cruising. The benchmark test is a level flight cruise in calm air. FIGS. 9 and 10 show the estimation error in longitudinal and lateral states, respectively, for the nominal cruising simulation. FIG. 11 is a table that presents the statistics for the nominal estimation errors for the GPS/AC (single antenna, low grade GPS sensor aided with aircraft dynamics). The most difficult states to estimate are the pitch angle and the pitch rate with respective errors of 1.6° rms and 2.8°/s rms.

Figure 12:
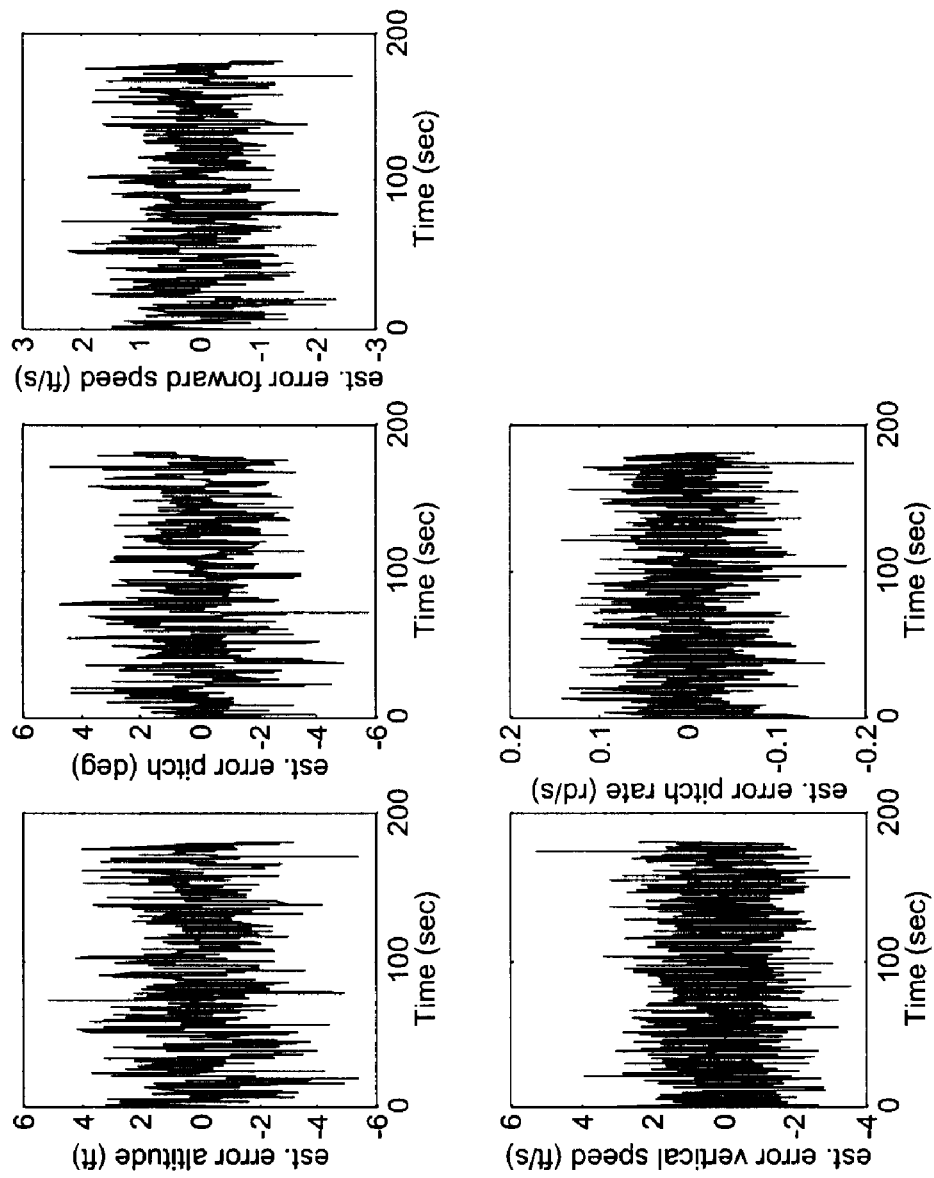
FIG. 12 depicts simulation plots of the longitudinal estimation errors for 5 degrees doublet in the horizontal tail.
Figure 13:
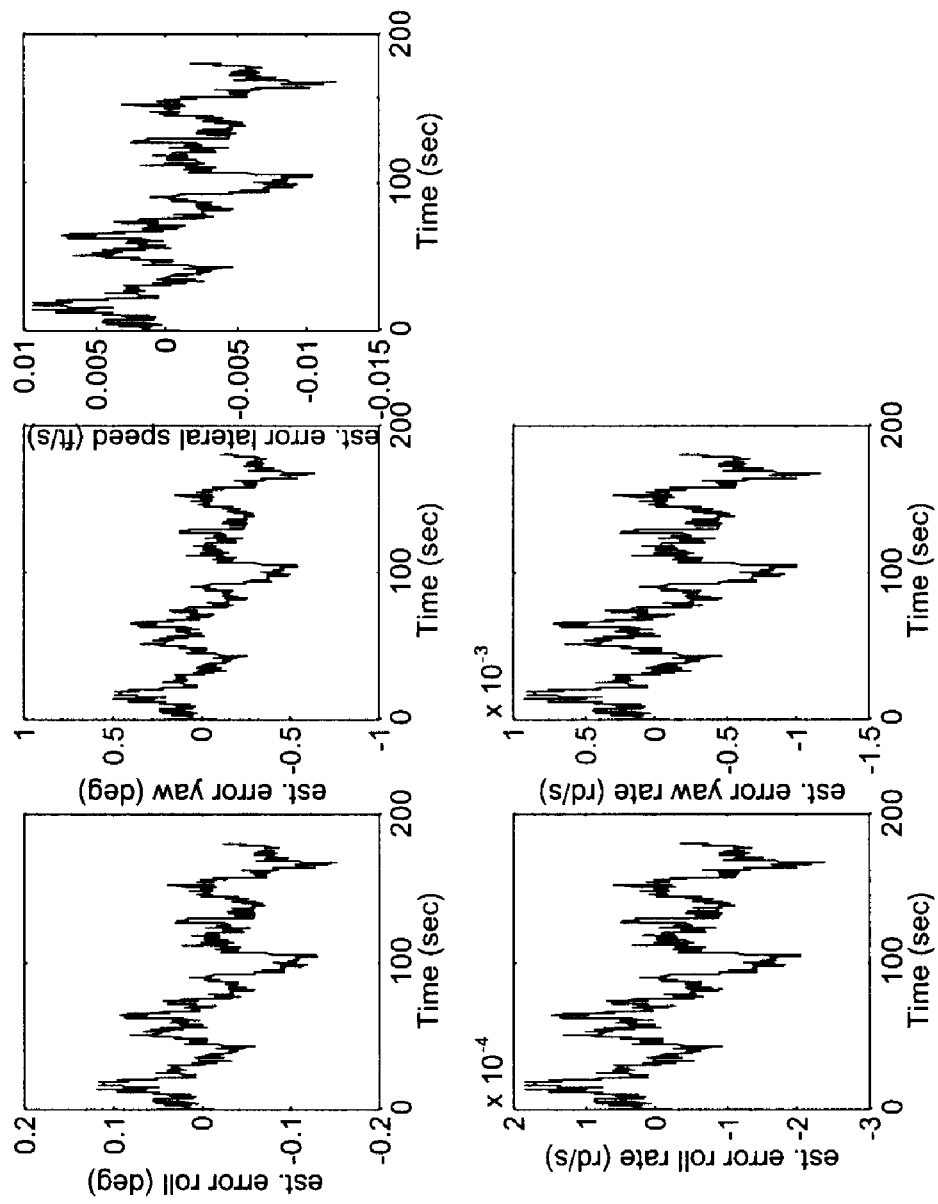
FIG. 13 depicts simulation plots of the lateral estimation errors for 5 degrees doublet in the horizontal tail.

FIGS. 12, 13 and 14 show the estimation errors for the example vehicle under a 5° doublet in the horizontal tail. Next, the performance of the GPS/AC scheme is investigated during nominal maneuvering. When a pilot wants to gain or lose altitude, he changes the deflection of the horizontal tail for a certain amount of time before returning it to its level flight position. In the simulation test, a command a 5° doublet in the horizontal tail is given for 10 seconds to gain altitude. The estimation errors in longitudinal and lateral modes are shown respectively in FIGS. 12 and 13. The table of FIG. 14 summarizes the mean and standard deviation of the estimation error for the nominal maneuvering simulation. It is important to note that the lateral states are estimated more precisely simply because there is no dynamic lateral motion, only smooth transitions.

3.3 Performance of the GPS/AC Scheme in Adverse Weather

Figure 15:
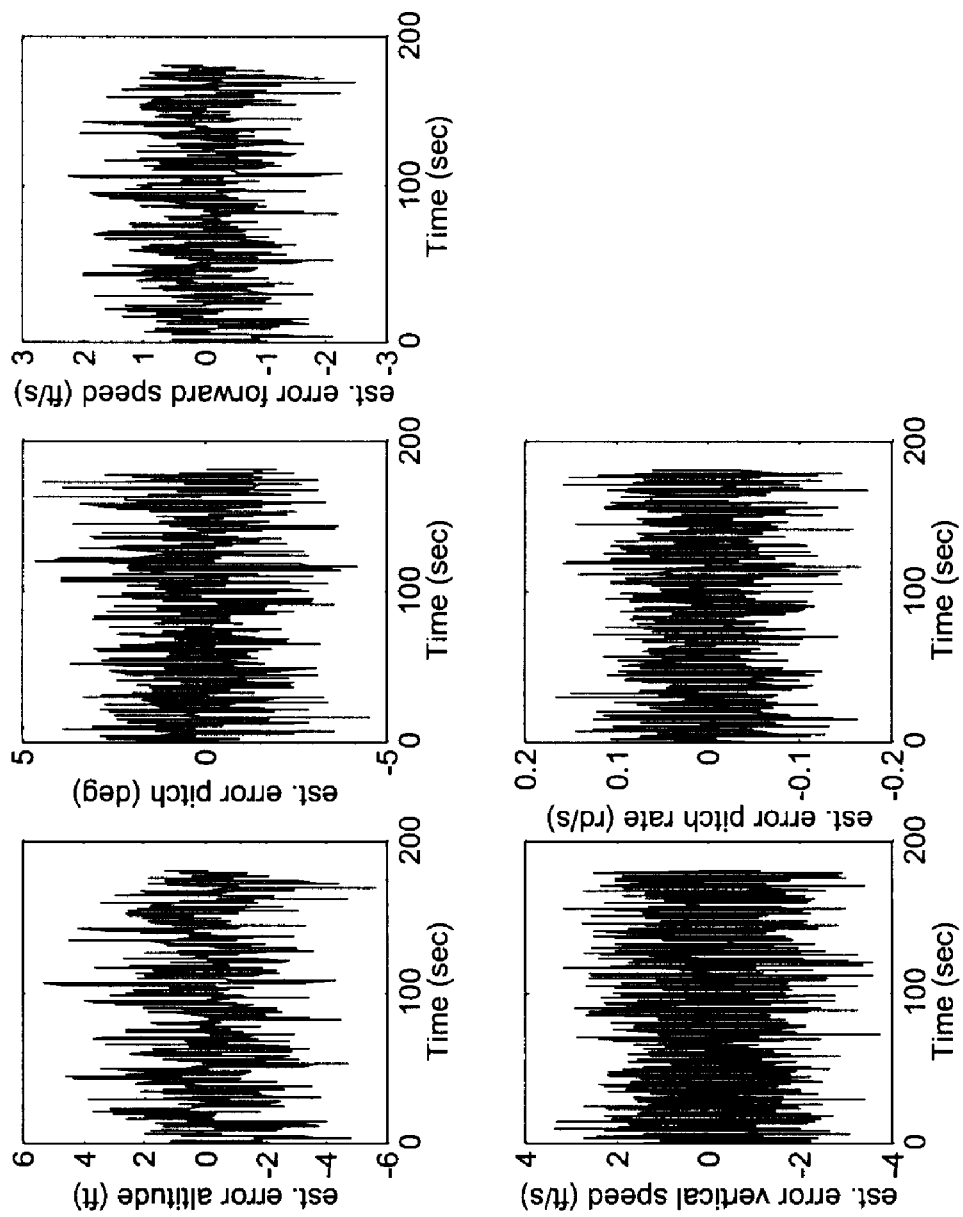
FIG. 15 depicts simulation plots of the longitudinal estimation errors for the doublet in the horizontal tail in adverse weather.
Figure 16:
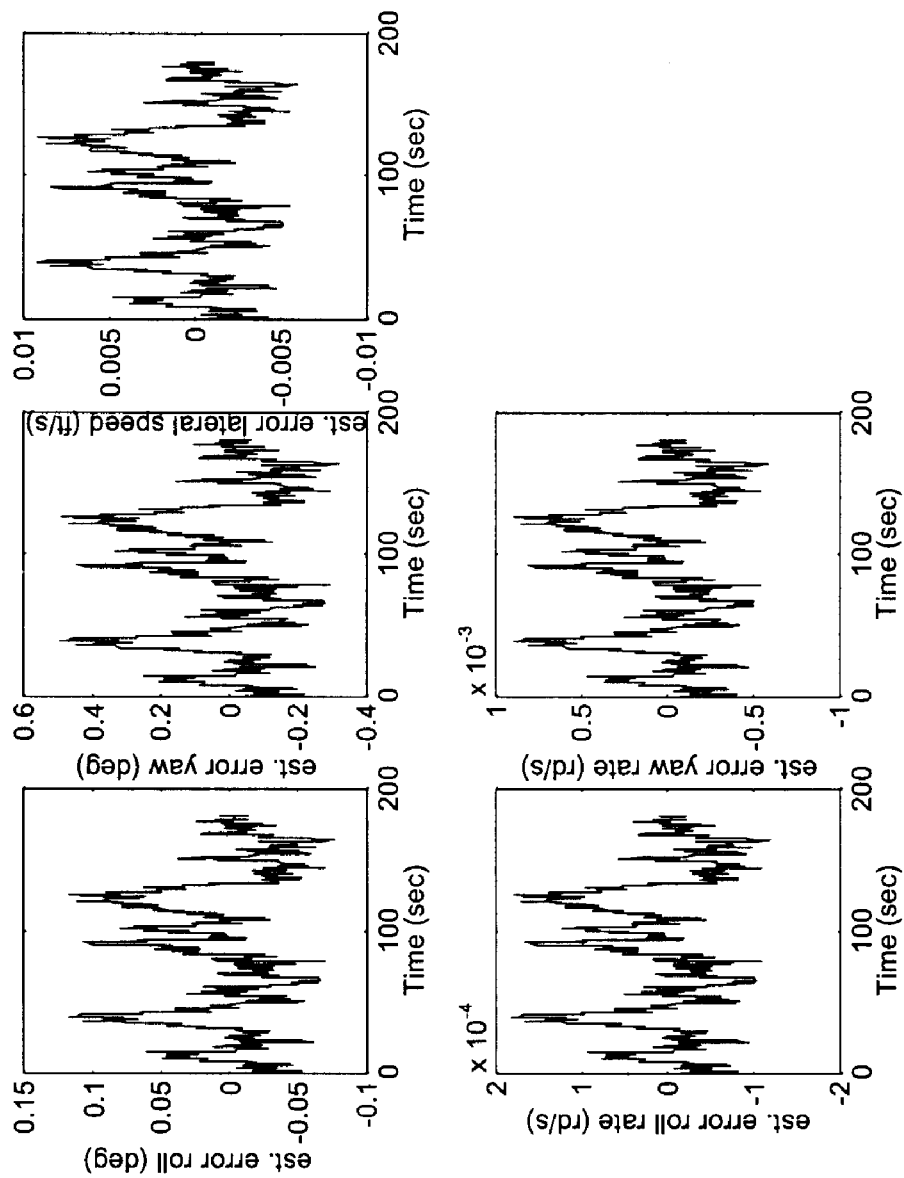
FIG. 16 depicts simulation plots of the lateral estimation errors for the doublet in the horizontal tail in adverse weather.

FIGS. 15, 16 and 17 show the estimation errors for the example vehicle in adverse weather. The aircraft is subjected to moderate vertical gust while changing altitude using the 5° doublet in horizontal tail. This simulation is representative of the performance of the GPS aided with aircraft dynamics, or GPS/AC system. The plant model used to design the estimator and the physical plant are the same, so that the difference between this simulation and the one in the previous section stem from the nonzero exogenous disturbance. The estimation errors for the longitudinal and lateral states are shown respectively in FIGS. 15 and 16. FIG. 17 is a table that summarizes the mean and standard deviation of the estimation error for the simulation of maneuvering in adverse weather. By comparing the statistics in FIGS. 14 and 17, the GPS/AC scheme proves robust to exogenous disturbances, which can represent adverse weather conditions.

3.4 Sensitivity of the GPS/AC Scheme to Aircraft Model

Whenever a model is used to design a navigation system, it is natural to investigate the degradation of the estimation quality due to a mismatch between the aircraft model and the actual aircraft. For the present invention, three typical scenarios have been selected in which the model for the estimator assumes more powerful controls, a more agile aircraft and a heavier aircraft.

Figure 18:
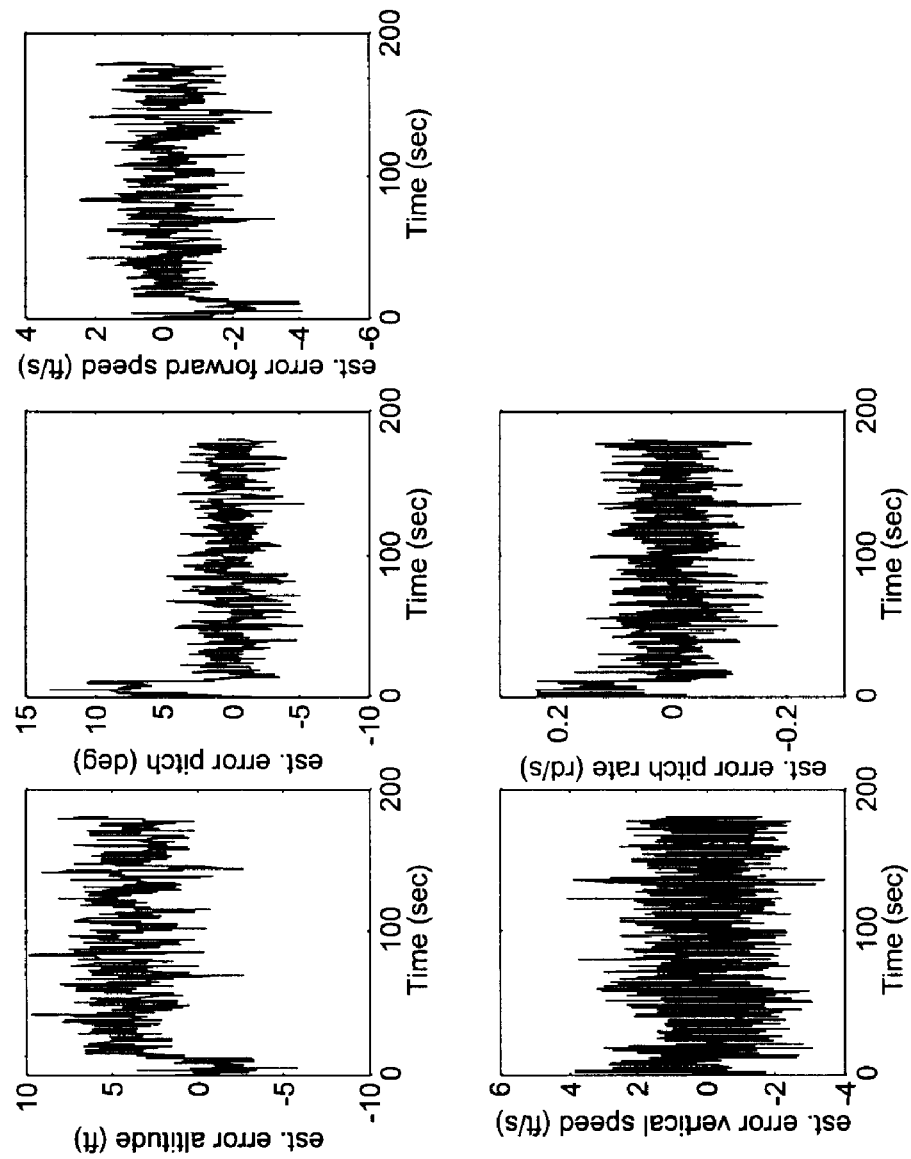
FIG. 18 depicts simulation plots of the longitudinal estimation errors for the doublet in the horizontal tail with mismatched tail efficiency.
Figure 19:
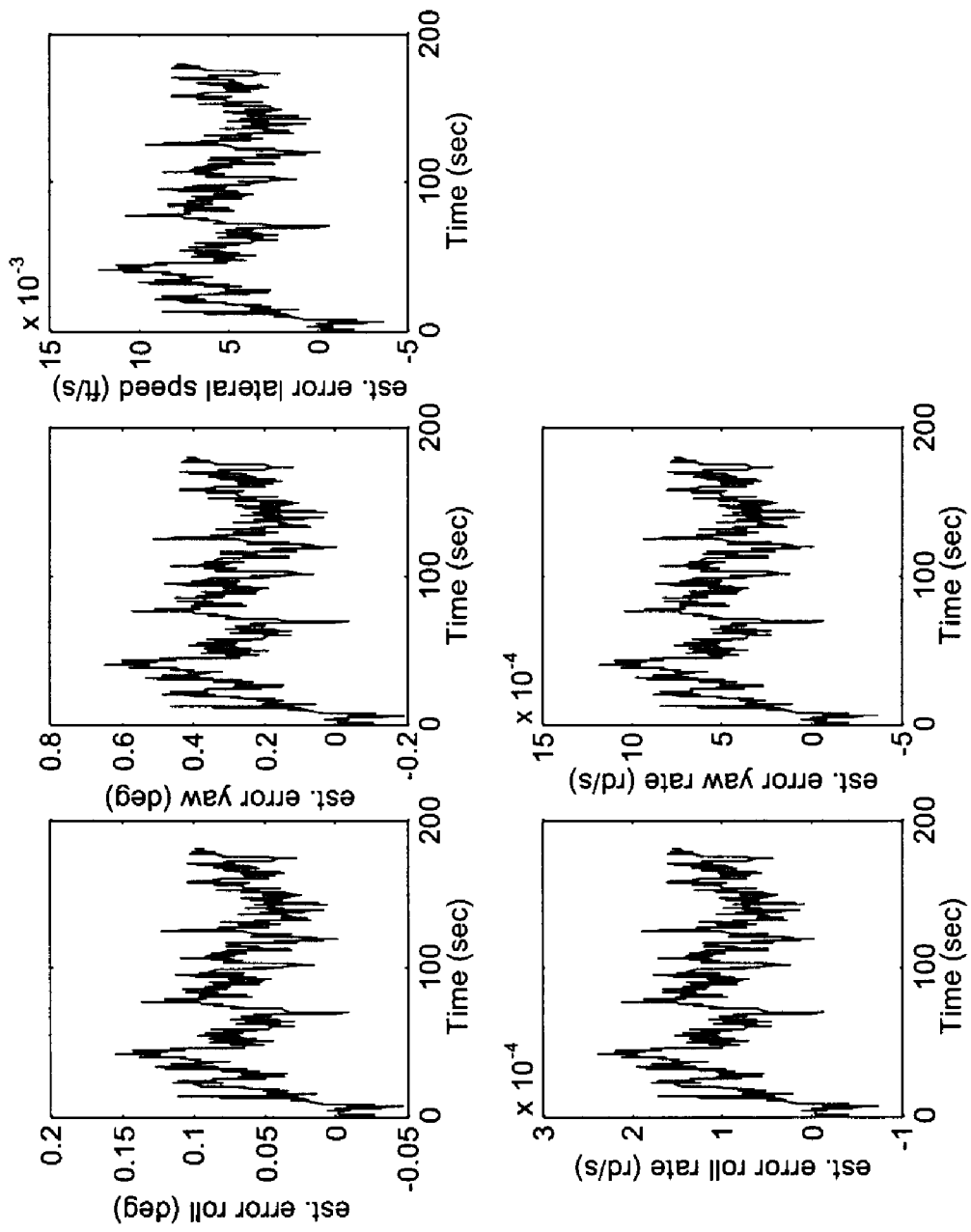
FIG. 19 depicts simulation plots of the lateral estimation errors for the doublet in the horizontal tail with mismatched tail efficiency.

FIGS. 18 and 19 show the estimation error for the longitudinal and lateral states, respectively. For the first scenario, the estimator is designed for an aircraft that has 25% more powerful horizontal tail. Therefore, when the doublet is applied to the tail, the estimator will overestimate the aircraft motion.

FIG. 20 is a table that summarizes the mean and standard deviation of the estimation error for the simulation of mismatched control efficiency. By comparing the statistics in FIGS. 14 and 20, the standard deviation of the estimation error does not change a lot when the mismatched tail efficiency. However, the mean estimation error in position increases as expected from overestimating the aircraft response. It is important to note that a 25% model mismatch is important but only yields submeter errors in position and slightly above a meter in altitude, which is still more precise than a single-antenna stand-alone GPS.

Figure 21:
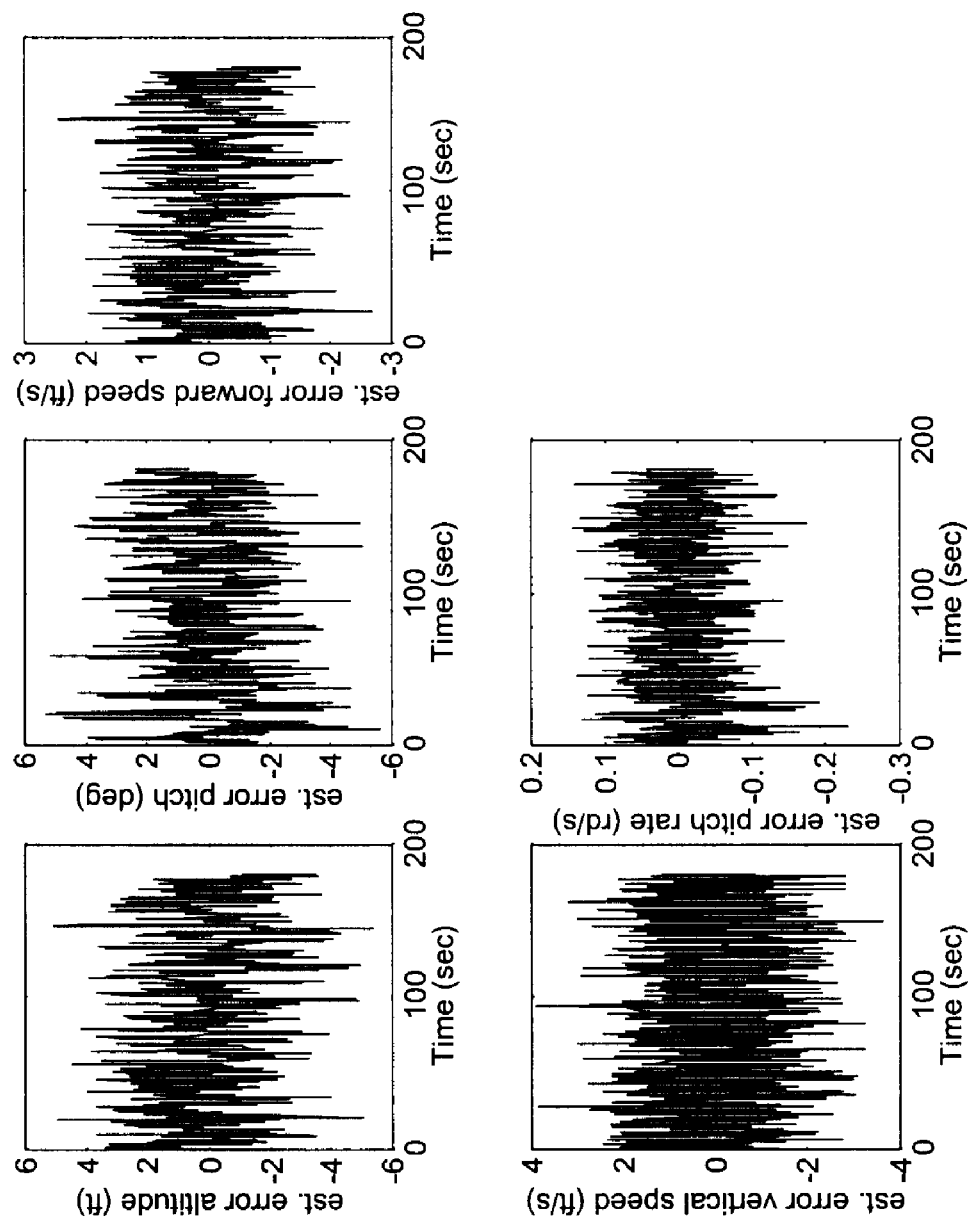
FIG. 21 depicts simulation plots of the longitudinal estimation errors for the doublet in the horizontal tail with mismatched pitching agility.
Figure 22:
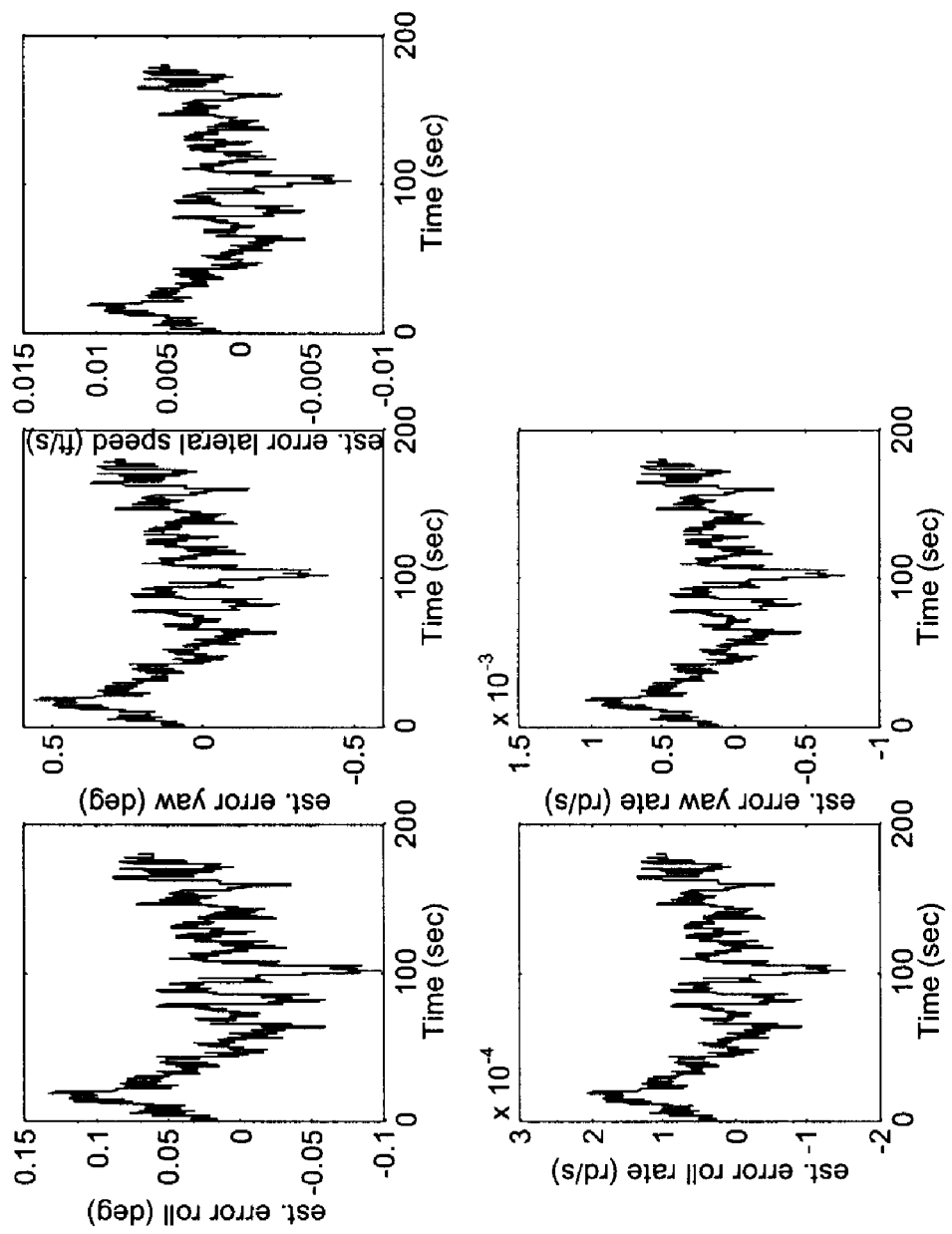
FIG. 22 depicts simulation plots of the lateral estimation errors for the doublet in the horizontal tail with mismatched pitching agility.

FIGS. 21 and 22 show the estimation errors for the longitudinal and lateral states, respectively. For the second scenario, the estimator is designed for a more agile aircraft in pitch, meaning the modeled aircraft responds quicker to a horizontal tail doublet than the real aircraft. Again, the estimator will overestimate the aircraft's motion.

FIG. 23 is a table that summarizes the mean and standard deviation for the estimation error. By comparing the statistics in FIGS. 14 and 23, the GPS/AC scheme is robust to uncertainty in the agility of the aircraft.

Figure 24:
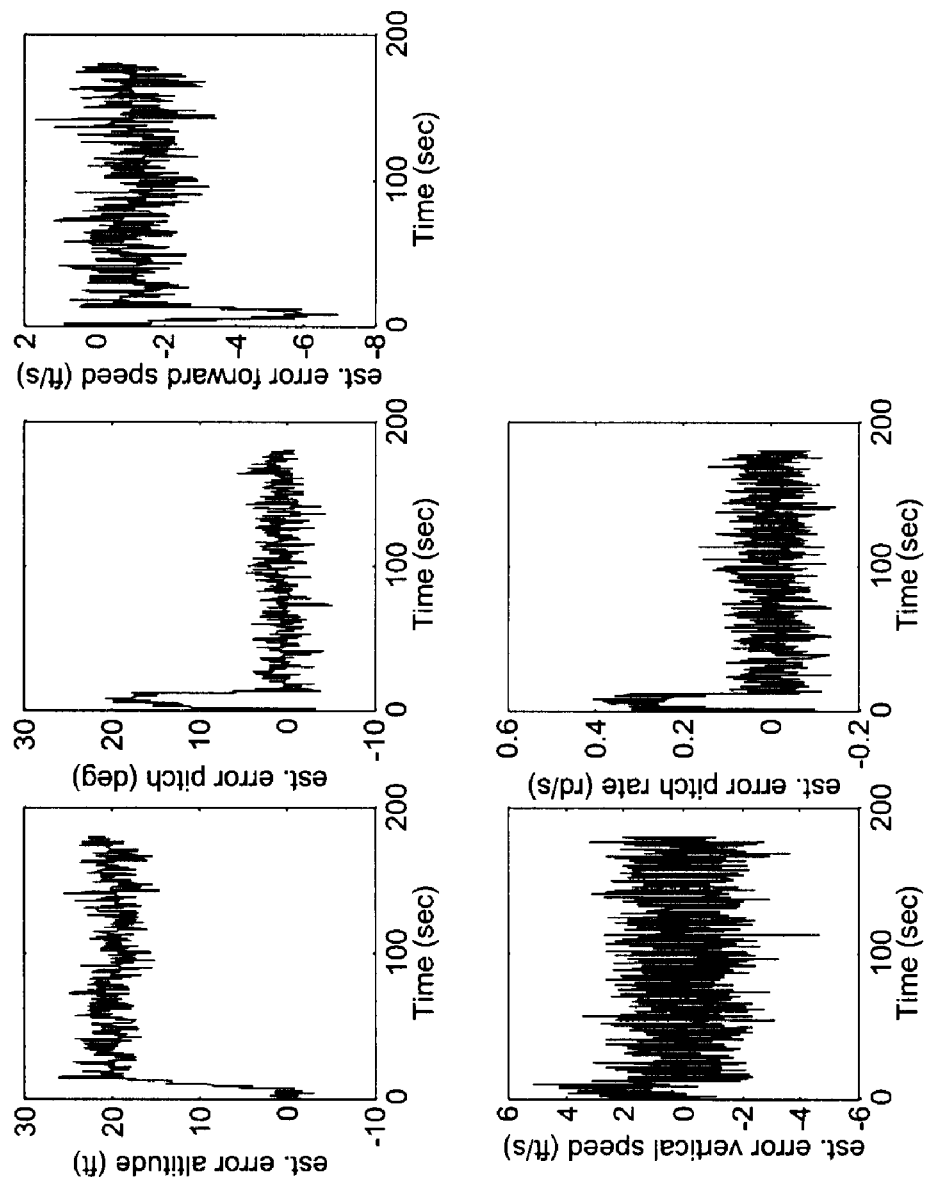
FIG. 24 depicts simulation plots of the longitudinal estimation errors for the doublet in the horizontal tail with mismatched weight.
Figure 25:
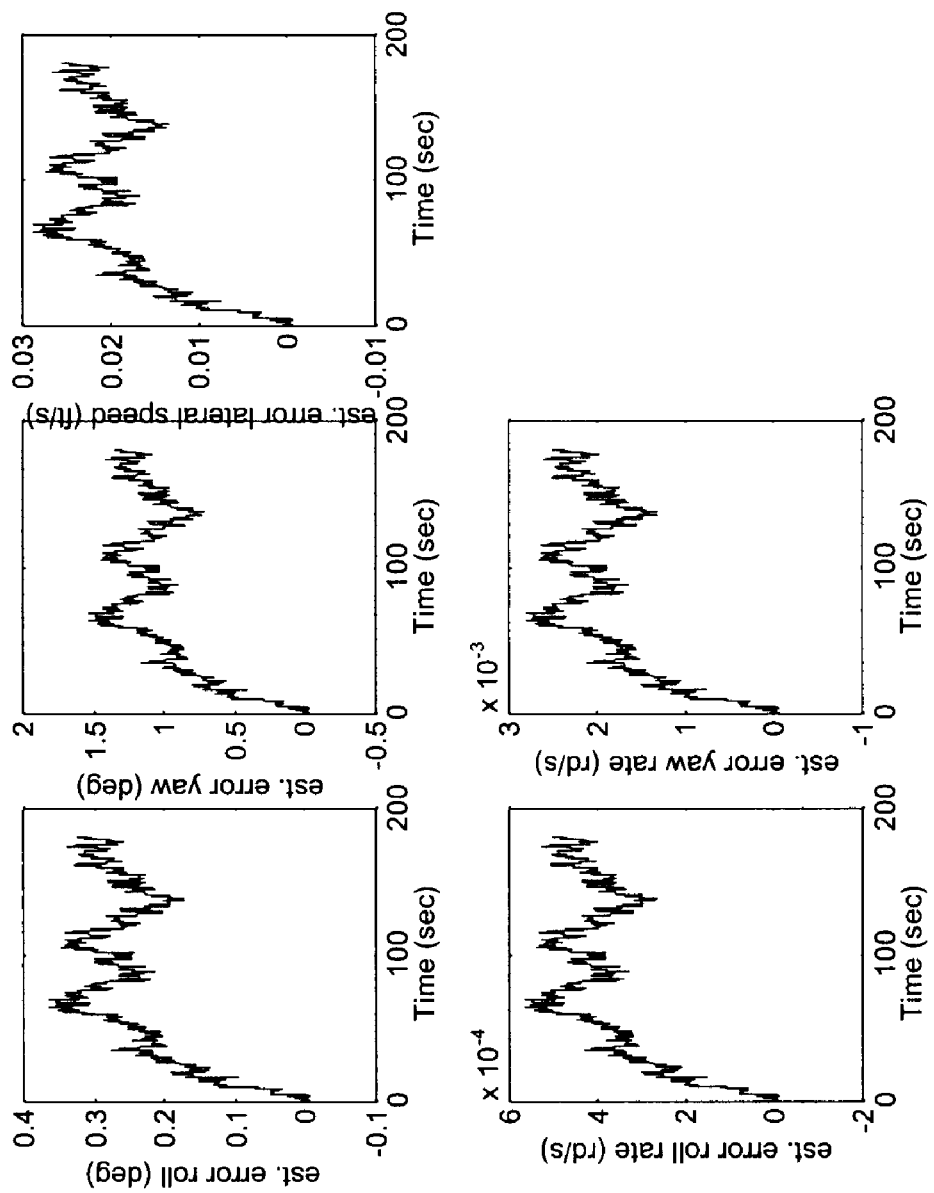
FIG. 25 depicts simulation plots of the lateral estimation errors for the doublet in the horizontal tail with mismatched weight.

FIGS. 24 and 25 show the estimation errors for the longitudinal and lateral states, respectively. For the remaining scenario, the most important uncertainty in modeling an aircraft is the weight. The estimator is designed for a 25% heavier aircraft. For comparison, in a Cessna skyhawk SP, the difference between carrying all allowed luggage and no luggage represents approximately a 7% change in the overall weight. A 25% change in weight is illustrated by designing the estimator for that aircraft with three 200 lb passengers and actually only having the pilot on board.

FIG. 26 is a table that summarizes the mean and standard deviation for the estimation error. By comparing the statistics in FIGS. 14 and 26, the mismatched weight affects the mean and standard deviation of the estimation error in position and altitude, pitch angle, yaw angle, longitudinal speed and pitch rate. However, it is important to note that when there is such a possible variety of weights, different gains for the estimator can be designed for different scenarios: empty weight and pilot, full luggage load, maximum number of passengers, maximum weight., etc. The pilot can then upload the closest estimator gain.

3.5 Robustness to Loss of GPS Signal

One difficulty with the present GPS/AC scheme is that it relies on the information from a single antenna. For an aircraft flying in the skies, it is rare to not obtain enough satellites to compute a position and velocity. However, in a worst case scenario, let us imagine that the pilot maneuvers the aircraft so as to have less than 4 satellites in sight from the GPS antenna. This is a transient period during which there is no measurement available to the estimator. The filter will then integrate the aircraft dynamics open loop until the signal is regained. Since the pilot can select the model for the aircraft in the estimator, the open loop dynamics should be close to the actual aircraft dynamics and, again, this a only a transient phenomenon.

References

The following publications are incorporated by reference herein.

[1] Parkinson, Spilker (Eds), Axelrad, and Enge (Assoc. Eds), Global Positioning System: Theory and Applications, AIAA, 1995.

[2] Anon., Flying Qualities of Piloted Airplanes. MIL-F-8785C, November 1980.

[3] Peter S. Maybeck, Stochastic Models, Estimation and Control, Academic Press, Inc., 1979.

CONCLUSION

Through these numerical simulations, the present invention demonstrates that aiding the GPS with the aircraft dynamics drastically improves the performance of the navigation system without requiring any additional hardware and algorithms. The state estimator can be as simple as a constant gain Kalman Filter. The invention produces reliable state estimates when flying in adverse weather and overestimating the agility or the control effectiveness of the aircraft. The GPS/AC scheme is however sensitive to weight mismatched between the model and the actual aircraft, but this issue is solved by having multiple gains stored on the computer that the pilot can upload depending on the total weight. The GPS/AC scheme is also sensitive to the loss of GPS signal, but this issue is dealt with by integrating open loop the aircraft dynamics as the loss of GPS signal for an aircraft is only transient.

The present invention a simple, relatively robust and cheap instrument to achieve attitude determination for an aircraft. Bonuses comprise the estimation of all other aircraft states like position, velocity and angular rates without requiring multiple gyros or accelerometers onboard. This innovative navigation aid is of interest to general aviation for which the additional cost of a coupled INS/GPS in a plane is too high a percentage of the overall cost.

FIG. 27 is a table that compares the precision claimed by a generic singleantenna GPS sensor, a good multi-antennae product, a military-use coupled GPS/IMU system and the present invention. Bear in mind that the invention uses a singleantenna, low grade GPS with only code information. Except for the estimation of the pitch angle, the accuracy results of the GPS aided with aircraft dynamics are similar if not even better than highly accurate GPS/INS systems. To the pilot however, an error of less than 2 degree is negligible. Moreover, some of the identified manufacturers' claims result from using highly accurate GPS with antennae separated by at least a meter or using a highly accurate inertial instrument. The example results, however, were obtained with a single antenna, low quality GPS receiver and no additional instrument. Again, the gain in hardware complexity and most of all cost, represented by the invention for a similar precision to current highly accurate systems.

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of vehicle attitude determination, comprising the steps of:
    (a) receiving position and velocity information data from a global positioning system receiver operating with only a single global positioning system antenna;
    (b) receiving vehicle dynamics information data from one or more vehicle dynamics sensors; and
    (c) determining a vehicle attitude from the position and velocity information and the vehicle dynamics information data using a Kalman filter;
    wherein the vehicle attitude is determined without inertial measurement information.

2. The method of claim 1, wherein the Kalman filter has a linear structure.

3. The method of claim 1, wherein the Kalman filter is an extended Kalman filter.

4. The method of claim 1, wherein the step of determining a vehicle attitude comprises the substep of selecting a gain matrix for the Kalman filter based upon a fixed external parameter.

5. The method of claim 1, wherein the Kalman filter uses a solution to vector equations, $x(k+1)=\Phi x(k)+Bu(k)$ and $z(k)=Cx(k)+v(k)$, wherein x is a vehicle state vector, $\Phi$ is a vehicle dynamics matrix, B is a vehicle control efficiency matrix, u is a vehicle control vector based upon the vehicle dynamics information data, z is a measurement vector based upon the position and velocity information data, C is a measurement coefficient matrix and v is a noise vector.

6. The method of claim 5, wherein the vehicle dynamics matrix and the vehicle control efficiency matrix are based upon vehicle parameters and the measurement coefficient matrix and noise vector are based upon global positioning receiver parameters.

7. The method of claim 5, wherein the Kalman filter uses a gain matrix, $L_k=PC^TV^{-1}$, where P is a solution to a Riccati matrix equation and V is a measurement noise covariance matrix.

8. The method of claim 5, wherein the state vector includes inertial positions, attitude angles, body axis speeds and angular rates of the vehicle.

9. The method of claim 5, wherein the control vector includes deflections of vehicle control surfaces.

10. The method of claim 5, wherein the vehicle control efficiency matrix includes efficiency values for vehicle control surfaces.

11. The method of claim 1, wherein the step of determining a vehicle attitude comprises the sub step of linearizing the position and velocity information.

12. The method of claim 1, wherein the step of determining a vehicle attitude is performed in a wind axis coordinate system.

13. An article of manufacture embodying logic to perform a method of vehicle attitude determination comprising the steps of:
(a) receiving position and velocity information data from a global positioning system receiver operating with only a single global positioning system antenna;
(b) receiving vehicle dynamics information data from one or more vehicle dynamics sensors; and
(c) determining a vehicle attitude from the position and velocity information data and the vehicle dynamics information data using a Kalman filter;
wherein the vehicle attitude is determined without inertial measurement information.

14. The article of claim 13, wherein the Kalman filter has a linear structure.

15. The article of claim 13, wherein the Kalman filter is an extended Kalman filter.

16. The article of claim 13, wherein the step of determining a vehicle attitude comprises the substep of selecting a gain matrix for the Kalman filter based upon a fixed external parameter.

17. The article of claim 13, wherein the Kalman filter uses a solution to vector equations, $x(k+1)=\Phi x(k)+Bu(k)$ and $z(k)=Cx(k)+v(k)$, wherein x is a vehicle state vector, $\Phi$ is a vehicle dynamics matrix, B is a vehicle control efficiency matrix, u is a vehicle control vector based upon the vehicle dynamics information data, z is a measurement vector based upon the position and velocity information data, C is a measurement coefficient matrix and v is a noise vector.

18. The article of claim 17, wherein the vehicle dynamics matrix and the vehicle control efficiency matrix are based upon vehicle parameters and the measurement coefficient matrix and noise vector are based upon global positioning receiver parameters.

19. The article of claim 17, wherein the Kalman filter uses a gain matrix, $L_k=PC^TV^{-1}$, where P is a solution to a Riccati matrix equation and V is a measurement noise covariance matrix.

20. The article of claim 17, wherein the state vector includes inertial positions, attitude angles, body axis speeds and angular rates of the vehicle.

21. The article of claim 17, wherein the control vector includes deflections of vehicle control surfaces.

22. The article of claim 17, wherein the vehicle control efficiency matrix includes efficiency values for vehicle control surfaces.

23. The article of claim 13, wherein the step of determining a vehicle attitude comprises the substep of linearizing the position and velocity information.

24. The article of claim 13, wherein the step of determining a vehicle attitude is performed in a wind axis coordinate system.

25. A system for vehicle orientation determination, comprising:
(a) a global positioning system receiver for determining position and velocity information data operating with only a single global positioning system antenna;
(b) one or more vehicle dynamics sensors for determining vehicle dynamics information data; and
(c) an attitude processor communicatively coupled to the global positioning system receiver unit and the one or more vehicle dynamics sensors for determining a vehicle attitude from the position and velocity information data and the vehicle dynamics information data using a Kalman filter;
wherein the vehicle attitude is determined without inertial measurement information.

26. The system of claim 25, wherein the Kalman filter has a linear structure.

27. The system of claim 25, wherein the Kalman filter is an extended Kalman filter.

28. The system of claim 25, wherein the attitude processor selects a gain matrix for the Kalman filter based upon a fixed external parameter.

29. The system of claim 25, wherein the Kalman filter uses a solution to vector equations, $x(k+1)=\Phi x(k)+Bu(k)$ and $z(k)=Cx(k)+v(k)$, wherein x is a vehicle state vector, $\Phi$ is a vehicle dynamics matrix, B is a vehicle control efficiency matrix, u is a vehicle control vector based upon the vehicle dynamics information data, z is a measurement vector based upon the position and velocity information data, C is a measurement coefficient matrix and v is a noise vector.

30. The system of claim 29, wherein the vehicle dynamics matrix and the vehicle control efficiency matrix are based upon vehicle parameters and the measurement coefficient matrix and noise vector are based upon global positioning receiver parameters.

31. The system of claim 29, wherein the Kalman filter uses a gain matrix, $L_k=PC^TV^{-1}$, where P is a solution to a Riccati matrix equation and V is a measurement noise covariance matrix.

32. The system of claim 29, wherein the state vector includes inertial positions, attitude angles, body axis speeds and angular rates of the vehicle.

33. The system of claim 29, wherein the control vector includes deflections of vehicle control surfaces.

34. The system of claim 29, wherein the vehicle control efficiency matrix includes efficiency values for vehicle control surfaces.

35. The system of claim 25, wherein the attitude processor linearizes the position and velocity information.

36. The system of claim 25, wherein the attitude processor determines the vehicle attitude in a wind axis coordinate system.

* * * * *